US008760478B2

(12) United States Patent
Manabe

(10) Patent No.: US 8,760,478 B2
(45) Date of Patent: Jun. 24, 2014

(54) DISPLAY CONTROL APPARATUS AND DISPLAY CONTROL METHOD

(75) Inventor: Yoshihiro Manabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/255,855

(22) PCT Filed: Mar. 9, 2010

(86) PCT No.: PCT/JP2010/001642
§ 371 (c)(1),
(2), (4) Date: Sep. 9, 2011

(87) PCT Pub. No.: WO2010/103798
PCT Pub. Date: Sep. 16, 2010

(65) Prior Publication Data
US 2011/0316903 A1 Dec. 29, 2011

(30) Foreign Application Priority Data
Mar. 11, 2009 (JP) .................................. 2009-058269

(51) Int. Cl.
*G09G 5/10* (2006.01)
(52) U.S. Cl.
USPC ........................................................ 345/690
(58) Field of Classification Search
USPC .................... 345/690, 76, 82, 698; 315/169.3
See application file for complete search history.

(56) References Cited

U.S. PATENT DOCUMENTS

| 2002/0097252 | A1* | 7/2002 | Hirohata ........................ 345/690 |
| 2005/0001935 | A1* | 1/2005 | Kiuchi et al. .................. 348/607 |
| 2005/0100095 | A1* | 5/2005 | Itoh et al. .................. 375/240.16 |
| 2008/0111835 | A1* | 5/2008 | Hu .................................. 345/690 |
| 2008/0180424 | A1* | 7/2008 | Ishihara ........................ 345/204 |
| 2008/0309601 | A1* | 12/2008 | Furukoshi ........................ 345/89 |
| 2009/0109247 | A1* | 4/2009 | Kimura ........................ 345/690 |
| 2009/0295841 | A1* | 12/2009 | Park et al. ..................... 345/690 |
| 2011/0001874 | A1* | 1/2011 | Ohta et al. ..................... 348/448 |

FOREIGN PATENT DOCUMENTS

| JP | 2006-098618 A | 4/2006 |
| JP | 2008-309873 A | 12/2008 |
| WO | 2007/052441 A1 | 5/2007 |
| WO | 2009/107331 A1 | 9/2009 |

* cited by examiner

*Primary Examiner* — Abbas Abdulselam
(74) *Attorney, Agent, or Firm* — Canon U.S.A., Inc. IP Division

(57) ABSTRACT

A change-information obtaining unit determines a pixel having a rapid decrease in luminance from an input video signal. A light-emitting-region determination unit determines whether or not the pixel having a rapid decrease in luminance is a light emitting pixel. When the area of a region formed by light emitting pixels is greater than or equal to a predetermined value, the light-emitting-region determination unit notifies a drive signal correction unit of the address of the region. The drive signal correction unit corrects a drive signal so that the luminance of the region at the notified address can be lower than that obtained without correction, and generates a display frame.

3 Claims, 12 Drawing Sheets

DISPLAY CONTROL APPARATUS AND DISPLAY CONTROL METHOD

TECHNICAL FIELD

The present invention relates to a method for controlling the display of a moving image.

BACKGROUND ART

Display apparatuses can be divided into those of an impulse type and those of a hold type depending on the light emission characteristics. Due to the nature of large changes in light emission intensity over time, impulse-type displays exhibit flicker on screens thereof.

One known method for addressing such an inconvenience is a high-speed driving method in which the drive frequency of displays is increased (to, for example, 120 Hz or 240 Hz) with respect to the input frame rate (for example, 60 Hz). This method can reduce the perception of flicker.

For example, PTL 1 discloses that the use of the high-speed driving method as described above leads to reduced perception of flicker.

CITATION LIST

Patent Literature

[PTL 1] Japanese Patent Laid-Open No. 2006-98618

SUMMARY OF INVENTION

Technical Problem

However, particularly in a case where the high-speed driving method is used, a rapid change in luminance of an object to be photographed may cause difficulty in display of video reflecting the rapid change.

For example, a rapid decrease in luminance of an object to be photographed for a short period of time may result in display of video with no accurate reflection of the rapid decrease in luminance. In particular, in a case where the high-speed driving method is employed, it may be difficult to accurately reflect a rapid decrease in luminance on a display screen.

The present invention enables display of video reflecting a rapid change in luminance of an object to be photographed.

Solution to Problem

In an aspect, the present invention provides a display control apparatus for generating a display frame corresponding to input frame data. The display control apparatus includes an input unit configured to receive input frame data; a comparison unit configured to compare a luminance of a first region in a display frame corresponding to input first input frame data with a luminance of the first region in a display frame corresponding to second input frame data input after the first input frame data; and a generation unit configured to generate a display frame corresponding to the first input frame data so that when the luminance of the first region in the display frame corresponding to the second input frame data is lower than the luminance of the first region in the display frame corresponding to the first input frame data by a threshold value or more, the luminance of the first region in the display frame corresponding to the first input frame data is lower than a luminance obtained when the luminance of the first region in the display frame corresponding to the second input frame data is not lower than the luminance of the first region in the display frame corresponding to the first input frame data by the threshold value or more.

Advantageous Effects of Invention

In an aspect of the present invention, video that reflects a rapid change in luminance of an object to be photographed can be displayed.

DESCRIPTION OF EMBODIMENTS

Exemplary embodiments of the present invention will now be described in detail with reference to the accompanying drawings. The configurations illustrated in the following embodiments are merely examples, and the present invention is not to be limited to the illustrated configurations.

First, a specific example in which it is difficult to reflect a rapid change in luminance on a display screen will be described with reference to FIGS. 1A to 1D.

Figure 1A:
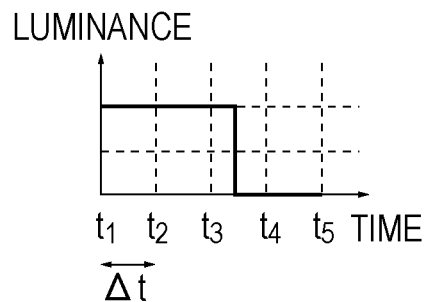
FIG. 1A is a diagram illustrating an example of a rapid change in luminance.
Figure 1B:
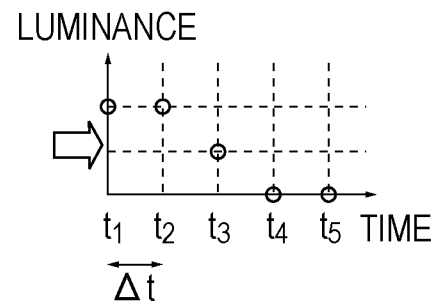
FIG. 1B is a diagram illustrating the example of the rapid change in luminance.

FIGS. 1A to 1D illustrate a change in luminance of an object to be photographed, with luminance on the ordinate and time on the abscissa. In FIG. 1B, an input video signal is illustrated. The input video signal has a signal value that is based on a change in luminance of the object to be photographed over an exposure time of delta t seconds. The luminance value of the input video signal is obtained by multiplying the luminance value of the object to be photographed by the time interval delta t, and is equal to the average luminance over the time interval delta t. For example, the average luminance over the period from time $t_1$ to time $t_2$ illustrated in FIG. 1A corresponds to the luminance of a frame at time $t_1$ illustrated in FIG. 1B. Similarly, the average luminance over the period from time $t_2$ to time $t_3$ illustrated in FIG. 1A corresponds to the luminance of a frame at time $t_2$ illustrated in FIG. 1B.

In the illustration of FIG. 1A, the luminance of the object to be photographed rapidly changes over the period from time $t_3$ to time $t_4$. Examples of scenes of such a rapid change include a scene with the light off and a scene with a clap of thunder. In FIG. 1B, the luminance obtained during the exposure time of delta t seconds is illustrated. If a rapid change in luminance occurs during the acquisition of frame data in the manner illustrated in FIG. 1A, as in FIG. 1B, the change in luminance of the input video signal may be slower than that of the actual change in luminance illustrated in FIG. 1A.

Figure 1C:
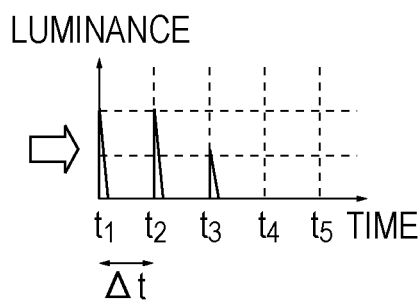
FIG. 1C is a diagram illustrating the example of the rapid change in luminance.

In FIG. 1C, a light emission characteristic obtained when the input video signal illustrated in FIG. 1B is displayed on an impulse-type display is illustrated. In the example illustrated in FIG. 1C, the display interval of each frame based on an input video signal is the same as the light emission interval of the display. In this manner, even when a rapid change in luminance actually occurs as in FIG. 1A, a displayed image may exhibit a slow change in luminance as illustrated in FIG. 1C.

Figure 1D:
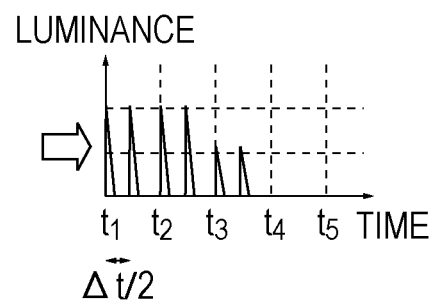
FIG. 1D is a diagram illustrating the example of the rapid change in luminance.

FIG. 1D illustrates an example in which the light emission interval of the display is 0.5 times that in FIG. 1C. In FIG. 1D, a light emission pattern similar to that illustrated in FIG. 1C is repeated twice with a light emission interval being a time of (delta t/2) seconds. In this case, a rapid change in luminance occurs in FIG. 1A whereas, in FIG. 1D, video with a slower change in luminance than that in FIG. 1C may be displayed because light emission of the display continues until the time given by $(t_3+0.5\times\text{delta t})$. Accordingly, in a case where a rapid change in luminance actually occurs, a reduction in light emission interval may cause more pronounced afterglow than that in FIG. 1C.

First Embodiment

System Configuration

Figure 2:
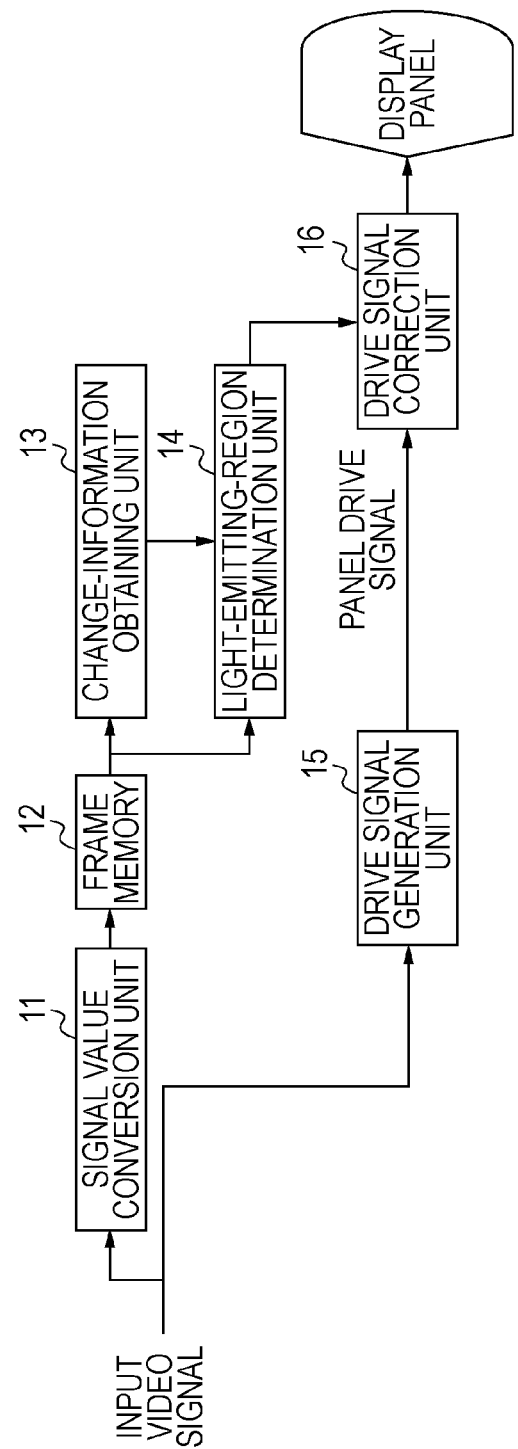
FIG. 2 is a block diagram illustrating a display control apparatus according to a first embodiment.

FIG. 2 is a block diagram illustrating an example configuration of a display control apparatus according to a first embodiment of the present invention. The display control apparatus according to the embodiment may be configured to control a display frame to be displayed with respect to an input video signal (input frame data).

As illustrated in FIG. 2, the display control apparatus according to the present embodiment includes a signal value conversion unit 11 (hereinafter referred to as a "conversion unit 11"), a frame memory 12, and a change-information obtaining unit 13 (hereinafter referred to as an "obtaining unit 13"). The display control apparatus according to the present embodiment further includes a light-emitting-region determination unit 14 (hereinafter referred to as a "determination unit 14"), a drive signal generation unit 15 (hereinafter referred to as a "generation unit 15"), and a drive signal correction unit 16 (hereinafter referred to as a "correction unit 16"). The display control apparatus according to the present embodiment has a built-in computer. The computer is provided with a main control unit such as a central processing unit (CPU) and a storage unit such as a read-only memory (ROM) or a random access memory (RAM). The computer may also be provided with, for example, an input/output unit such as a display or a touch panel, and a communication unit such as a network card. The elements described above are connected to one another via a bus or the like, and the main control unit executes a program stored in the storage unit, thereby controlling the elements.

The conversion unit 11 receives an input video signal (input frame data). The conversion unit 11 converts the input video signal into luminance information, and outputs the obtained luminance information to the frame memory 12.

The frame memory 12 stores luminance information output from the conversion unit 11 for a plurality of frames. The obtaining unit 13 reads the luminance information on the plurality of frames, which is stored in the frame memory 12, and obtains luminance change information about individual pixels. The obtaining unit 13 according to the present embodiment compares luminance information on a given frame with luminance information on a frame subsequent to the given frame, and obtains luminance change information.

Specifically, the obtaining unit 13 compares the luminance of a pixel in a display frame corresponding to input frame data with the luminance of a corresponding pixel in a display frame corresponding to subsequent input frame data. In this case, the obtaining unit 13 compares the luminance values of pixels having the same address on the display screen, and obtains luminance change information based on the amount of change. The obtaining unit 13 further determines a pixel having a rapid decrease in luminance on the basis of the obtained luminance change information. Then, the obtaining unit 13 notifies the determination unit 14 of address information indicating the position of the pixel having a rapid decrease in luminance on a display screen. The details of the method for determining a pixel having a rapid decrease in luminance using the obtaining unit 13 will be described in detail below.

Upon receipt of the notification of the address information from the obtaining unit 13, the determination unit 14 reads luminance information about the pixel corresponding to the address information from the frame memory 12. Then, the determination unit 14 determines whether or not the pixel at the address with the rapid decrease in luminance is a light emitting pixel. In other words, the determination unit 14 determines, for an address with a rapid decrease in luminance, whether or not the luminance of the pixel before the rapid decrease in luminance is higher than a predetermined luminance value.

When the luminance of the pixel before the rapid decrease in luminance is higher than the predetermined luminance value, the determination unit 14 determines that the pixel at the above address is a light emitting pixel. When the area of a region formed by pixels determined to be light emitting pixels is greater than a predetermined value, the determination unit 14 according to the present embodiment determines that the region is a light emitting region. Then, the determination unit 14 notifies the correction unit 16 of address information about the light emitting region. The determination of a light emitting pixel and the determination of a light emitting region, which are performed by the determination unit 14, will be described in detail below.

The generation unit 15 receives the input video signal (input frame data). Then, the generation unit 15 generates a drive signal for driving a panel on the basis of the input video signal. The generation unit 15 outputs the generated drive signal to the correction unit 16.

The correction unit 16 corrects the drive signal output from the generation unit 15 on the basis of the address information about the light emitting region notified by the determination unit 14. Specifically, the correction unit 16 corrects the drive signal output from the generation unit 15 to generate a panel drive signal (display frame) which is used to actually drive a display panel. That is, the correction unit 16 generates a display frame corresponding to the input video signal (input frame data). In this regard, the correction unit 16 corrects the drive signal output from the generation unit 15 so that the change in luminance at the display position corresponding to the notified address information can become more rapid. The process for correcting a drive signal using the correction unit 16 will be described below.

Process of Entire System

Figure 3:
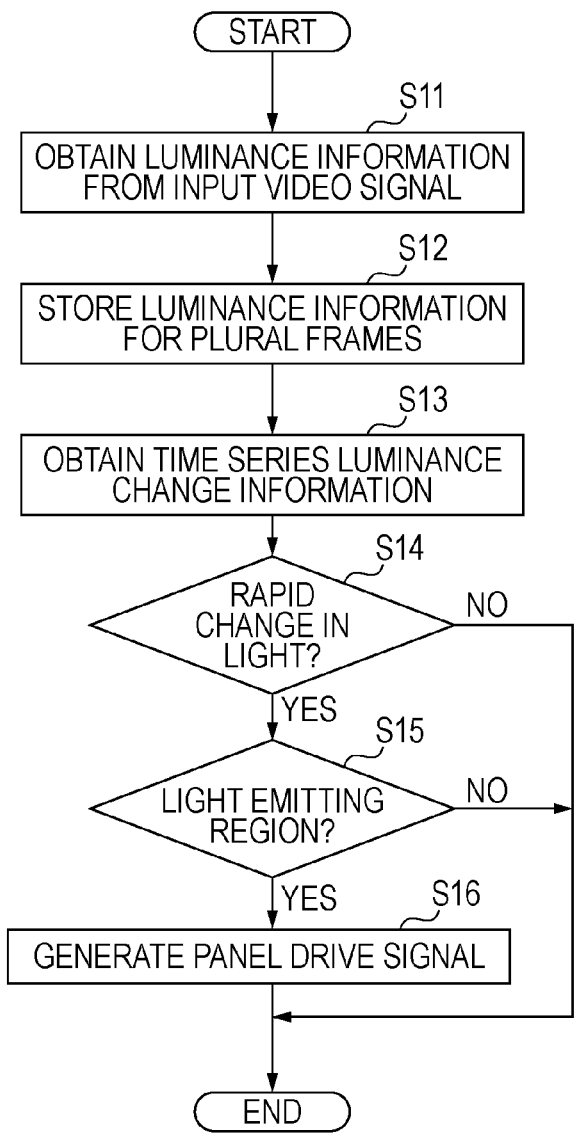
FIG. 3 is a flowchart illustrating a process performed by a display control apparatus.

Next, the operation of the embodiment will be described with reference to a flowchart illustrated in FIG. 3.

In step S11 (input procedure), an input video signal is input to the conversion unit 11 and the generation unit 15. In step S11, further, the conversion unit 11 converts the input video signal into luminance information (S11). For example, when the input video signal is given in terms of RGB values in sRGB color space, the conversion unit 11 converts the RGB values into XYZ values, L*a*b* values, or other suitable values. However, the RGB values or YcbCr values of the input video signal may be used as they are without being converted by the conversion unit 11 to implement the present invention. In the embodiment, RGB values are converted into XYZ values, by way of example.

First, the conversion unit 11 normalizes the RGB values that are based on the input video signal to values of 1 or less, as given by equations (1).

[Math. 1]

$R' = R_{8bit}/255$ $G' = G_{8bit}/255$ $B' = B_{8bit}/255$ (1)

When the values R', G', and B' are less than 0.04045, normalized RGB values are calculated using the following equations:

[Math. 2]

$R = R'/12.92$ $G = G'/12.92$ $B = B'/12.92$ (2)

When the values R', G', and B' are greater than 0.04045, normalized RGB values are calculated using the following equations:

[Math. 3]

$R = ((R'+0.055)/(1.055))^\gamma$ $G = ((G'+0.055)/(1.055))^\gamma$ $B = ((B'+0.055)/(1.055))^\gamma$ (3)

In the above equations, gamma denotes the gamma coefficient of the input video signal and is 2.4 for sRGB signals.

Thereafter, the conversion unit 11 converts the calculated RGB values into XYZ values as given by the following equation:

[Math. 4]

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix}$$ (4)

In step S11, the conversion unit 11 outputs the Y value (luminance information) in the XYZ values obtained in the manner described above to the frame memory 12. When the luminance information is output to the frame memory 12, the process proceeds to step S12.

In step S12, the frame memory 12 stores the Y value (luminance information) output from the conversion unit 11. Note that the frame memory 12 stores luminance information on a plurality of frames. When the frame memory 12 stores the luminance information output from the conversion unit 11, the process proceeds to step S13.

In step S13, the obtaining unit 13 reads Y values (luminance information) for a plurality of frames from the frame memory 12, and obtains luminance change information k. The obtaining unit 13 according to the embodiment compares luminance information on a given frame with luminance information on a frame subsequent to the given frame, and obtains the amount of change in luminance between the frames. Then, the obtaining unit 13 obtains the amounts of change in luminance between frames for all pixels in each frame. FIGS. 4A to 4D illustrate an example method for obtaining the luminance change information k using the obtaining unit 13.

Figure 4A:
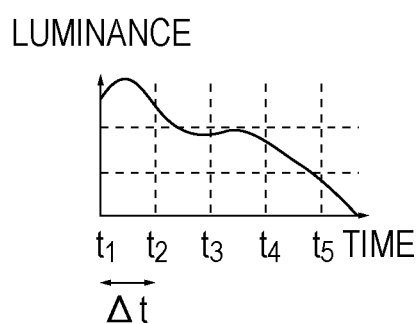
FIG. 4A is a diagram illustrating a process performed by a change-information obtaining unit.
Figure 4B:
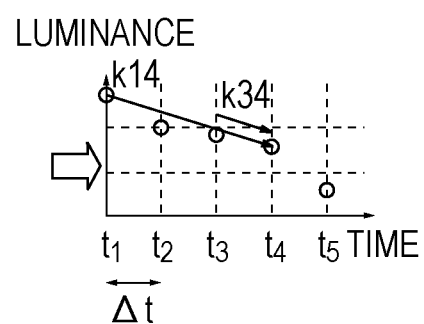
FIG. 4B is a diagram illustrating the process performed by the change-information obtaining unit.
Figure 4C:
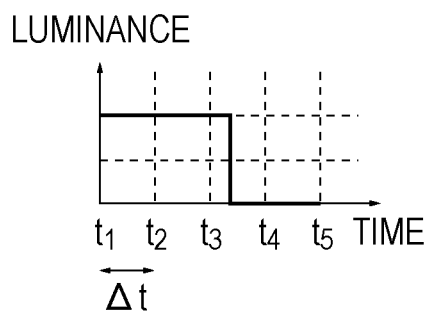
FIG. 4C is a diagram illustrating the process performed by the change-information obtaining unit.
Figure 4D:
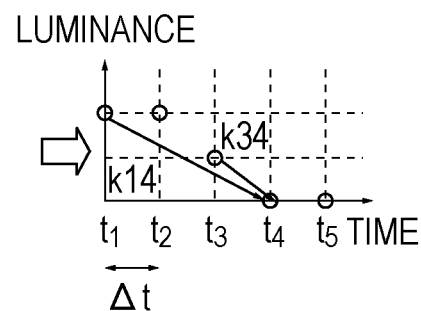
FIG. 4D is a diagram illustrating the process performed by the change-information obtaining unit.

FIGS. 4A and 4B illustrate an example of a slow decrease in luminance at a certain address between frames. FIGS. 4C and 4D illustrate an example of a rapid decrease in luminance at a certain address between frames.

As illustrated in FIGS. 4A to 4D, the obtaining unit 13 according to the embodiment obtains the rate of change in luminance (amount of change in luminance/time) between a frame (first frame) displayed at time $t_3$ and a frame (second frame) displayed at time $t_4$, which is input after the first frame. The obtaining unit 13 according to the embodiment also obtains the rate of change in luminance between the frame (second frame) displayed at time $t_4$ and a frame (third frame) displayed at time $t_1$, which is input before the first frame. In this manner, the obtaining unit 13 according to the embodiment obtains the two rates of change in luminance as luminance change information k. When the rate of change in luminance between the frame at time $t_3$ and the frame at time $t_4$ is represented by luminance change information k34 and the rate of change in luminance between the frame at time $t_1$ and the frame at time $t_4$ is represented by luminance change information k14, the value of the luminance change information k14 and the value of the luminance change information k34 can be determined using Equations (5) and (6), respectively:

$$k14=(Y(t_4)-Y(t_1))/(t_4-t_1) \quad (5)$$

$$k34=(Y(t_4)-Y(t_3))/(t_4-t_3) \quad (6)$$

The obtaining unit 13 according to the embodiment obtains the luminance change information k14 as below with respect to the frame (first frame) displayed at time $t_3$. That is, the obtaining unit 13 calculates the difference between the luminance of the frame (second frame) subsequent to the first frame and the luminance of the frame (third frame) two frames preceding the first frame. Then, the obtaining unit 13 obtains the luminance change information k14 on the basis of the calculated difference and the difference between time $t_1$ and time $t_4$.

In the above equations, Y(t) is the Y value in the XYZ values, and denotes the function at time t. As can also be seen from FIGS. 4A to 4D, the greater the calculated value of the luminance change information k, the greater the amount of change in luminance per time. In other words, the greater the value of the luminance change information k, the greater the gradient in FIGS. 4B and 4D. The obtaining unit 13 according to the embodiment calculates the luminance change information k14 and the luminance change information k34 in terms of absolute value. When the obtaining unit 13 obtains the luminance change information k, the process proceeds to step S14.

In step S14, the obtaining unit 13 determines whether or not the decrease in luminance is rapid on the basis of the luminance change information k14 and the luminance change information k34 obtained in step S13. Specifically, for example, when the rate of decrease in luminance for the period from time $t_3$ to time $t_4$ is greater than the rate of decrease in luminance for the period from time $t_1$ to time $t_4$ by a predetermined value or more, the obtaining unit 13 determines that the decrease in luminance is rapid.

When the luminance at time $t_4$ is lower than the luminance at times $t_1$ and $t_3$ and when the value of the luminance change information k34 is greater than the value of the luminance change information k14 by a predetermined value or more, the obtaining unit 13 determines that the decrease in luminance is rapid. That is, as illustrated in FIG. 4B, when the gradient represented by the luminance change information k14 is close to the gradient represented by the luminance change information k34, it is determined that the decrease in luminance is not rapid. In contrast, as illustrated in FIG. 4D, when the gradient represented by the luminance change information k14 and the gradient represented by the luminance change information k34 are greatly different from each other, it is determined that the change in luminance is rapid.

The obtaining unit 13 determines a threshold value on the basis of the difference between the luminance of the third frame (the frame at time $t_1$) input before the first frame (the frame at time $t_3$) and the luminance of the second frame (the frame at time $t_4$). Then, the obtaining unit 13 determines that a pixel for which the difference in luminance between the first and second frames is greater than the determined threshold value is a pixel having a rapid decrease in luminance.

Therefore, the larger the difference between the luminance of the third frame (the frame at time $t_1$) and the luminance of the second frame (the frame at time $t_4$), the higher the threshold value is set. That is, when the difference between the luminance of the third frame and the luminance of the second frame is represented by a first difference, the obtaining unit 13 determines a threshold value so that the difference between the luminance of the third frame and the luminance of the second frame is higher than a second difference that is smaller than the first difference.

The obtaining unit 13 may not necessarily use the method described above to determine whether or not the change in luminance is rapid, but may use any other method. A possible method may be to, for example, calculate the second derivatives of luminance between frames and to detect a portion having a large absolute value of the second derivative. Alternatively, the obtaining unit 13 may calculate the amounts of change in luminance between a current frame and a frame to be reproduced next, and detect a portion having a large amount of change in luminance.

When it is determined in step S14 that the decrease in luminance is rapid, the obtaining unit 13 outputs the address indicating the corresponding position on the display screen to the determination unit 14. When the address is output to the determination unit 14, the process proceeds to step S15.

In step S15, the determination unit 14 determines whether or not the pixel at the address at which it is determined that the decrease in luminance is rapid is a light emitting pixel. Specifically, the determination unit 14 determines, for the pixel at the address at which it is determined that the decrease in luminance is rapid, whether or not the luminance obtained before the rapid decrease is higher than a predetermined luminance value. When the luminance obtained before the rapid decrease is higher than the predetermined luminance value, the determination unit 14 determines that the pixel is a light emitting pixel. In other words, the light emitting pixel is a pixel that has a rapid decrease in luminance and for which the luminance obtained before the rapid decrease in luminance is higher than the predetermined luminance value.

When the area of a region formed by light emitting pixels is greater than a predetermined value, the determination unit 14 determines that the region is a light emitting region, and outputs the address of the region to the correction unit 16. A method for determining the area of a region formed by light emitting pixels will be described below with reference to FIG. 5. However, the addresses of the light emitting pixels may be sent regardless of the size of the region. When the above processes performed by the determination unit 14 have been completed, the process proceeds to step S16.

Figure 6A:
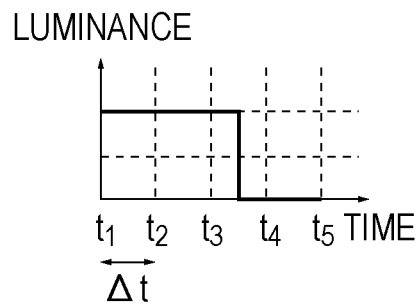
FIG. 6A is a diagram illustrating the state of a display screen obtained when the process according to the present invention is not performed.

The input video signal is input not only to the generation unit 15 but also to the conversion unit 11 in step S11 (input procedure). During the period of steps S12 to S15, the generation unit 15 generates a drive signal for driving a panel on the basis of the input video signal, and outputs the drive signal to the correction unit 16. As illustrated in FIGS. 6A to 6D, the generation unit 15 according to the embodiment generates a drive signal so as to have a drive frequency that is twice as high as the drive frequency of the input video signal. Specifically, as illustrated in FIG. 6C, the generation unit 15 generates a drive signal for driving a panel twice during the time interval delta t.

Figure 6B:
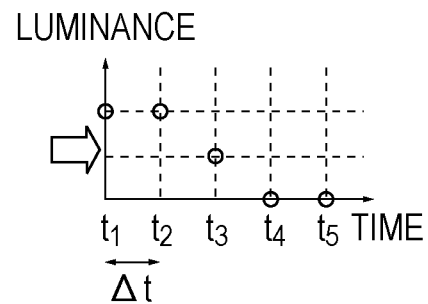
FIG. 6B is a diagram illustrating the state of the display screen obtained when the process according to the present invention is not performed.
Figure 6C:
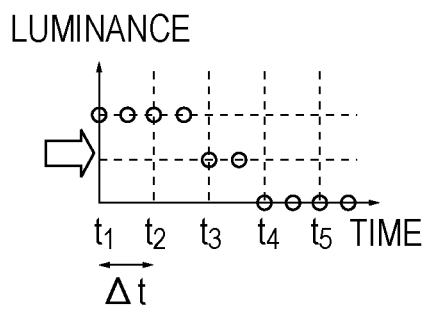
FIG. 6C is a diagram illustrating the state of the display screen obtained when the process according to the present invention is not performed.
Figure 6D:
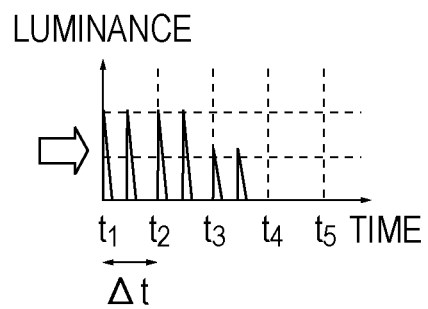
FIG. 6D is a diagram illustrating the state of the display screen obtained when the process according to the present invention is not performed.

Since the generation unit 15 generate a drive signal for driving a panel at an interval equal to 0.5 times the interval of the input video signal illustrated in FIG. 6B, a drive signal has a time interval of (delta t/2) seconds, resulting in a panel drive signal illustrated in FIG. 6C. In this case, display light of an impulse-type display is as illustrated in FIG. 6D.

In step S16 (generation procedure), the correction unit 16 corrects the drive signal output from the generation unit 15 on the basis of the address of the light emitting region output from the determination unit 14. That is, in step S16, the correction unit 16 generates a panel drive signal (display frame) that is used to actually drive a display panel. The correction unit 16 can correct the drive signal so that, for example, the luminance of a pixel in a light emitting region can be lower than that obtained when the drive signal is not corrected. The correction unit 16 may also correct the drive signal so that, for example, the luminance of a pixel in a light emitting region can be higher than that obtained when the drive signal is not corrected.

Figure 7A:
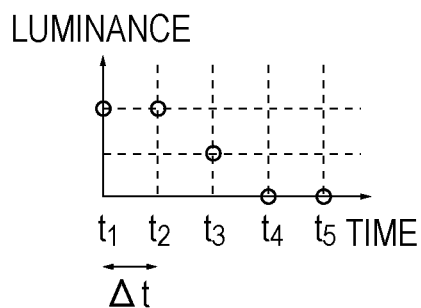
FIG. 7A is a diagram illustrating an example of a correction process according to the first embodiment.
Figure 7B:
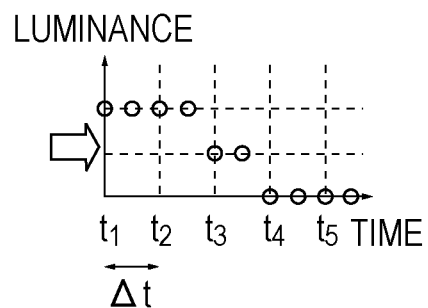
FIG. 7B is a diagram illustrating the example of the correction process according to the first embodiment.

An example of a case where the luminance of a pixel in a light emitting region is reduced will be described with reference to FIGS. 7A to 7D. When the luminance of an object at a certain address actually changes in the manner illustrated in FIG. 6A, an input video signal illustrated in FIG. 7A is obtained. Then, the generation unit 15 generates a drive signal as illustrated in FIG. 6B on the basis of the input video signal. It is assumed that the obtaining unit 13 determines that a rapid decrease in luminance has occurred during a period from time $t_3$ to time $t_4$. When the determination unit 14 determines that the pixel is within a light emitting region, the correction unit 16 is notified of the address of the pixel.

When the luminance of the pixel at the notified address in a frame at time $t_3$ is higher than a predetermined luminance value, the determination unit 14 determines that the pixel is a light emitting pixel. As described below with reference to FIG. 5, when the area of a region (light emitting region) formed by pixels determined to be light emitting pixels is greater than a predetermined value, the determination unit 14 according to the embodiment notifies the correction unit 16 of the addresses of the light emitting pixels.

The correction unit 16 corrects the drive signal so that the luminance of the pixel at the address output from the determination unit 14 can be lower than the luminance of the drive signal. The corrected panel drive signal is as illustrated in, for example, FIG. 7C. In this manner, the correction unit 16 corrects the drive signal generated by the generation unit 15 so that the decrease in luminance from the first frame (the frame at time $t_3$) to the second frame (the frame at time $t_4$) is rapid and that the luminance, in the first frame, of a pixel (light emitting pixel) for which the luminance obtained before decrease is higher than a predetermined luminance value can be reduced.

Specifically, upon receipt of the address of a light emitting pixel, the correction unit 16 generates a display frame (panel drive signal) corresponding to the first frame (first input frame data). When the luminance of a light emitting region (first region) in a display frame corresponding to a second frame input after the first frame is lower than the luminance of the first region in the display frame corresponding to the first frame by a threshold value or more, the correction unit 16 generates a display frame as follows. That is, the correction unit 16 generates a display frame so that the luminance of the first region in the display frame corresponding to the first frame can be lower than that obtained when the luminance of the first region in the second frame is not lower than the luminance of the first region in the first frame by the threshold value or more.

In the embodiment, when the area of a region formed by light emitting pixels is greater than or equal to a predetermined value, the drive signal is corrected so that the change in luminance of the region (first region) can become rapid. This can prevent the correction of the drive signal with respect to a light emitting pixel caused by, for example, a noise signal. However, any other configuration may be used. For example, the drive signal may be corrected regardless of the size of a region formed by light emitting pixels. Furthermore, for example, the correction unit 16 can determine the luminance on a frame-by-frame basis and can correct the drive signal so that the change in luminance of an entire frame can become rapid.

Figure 7C:
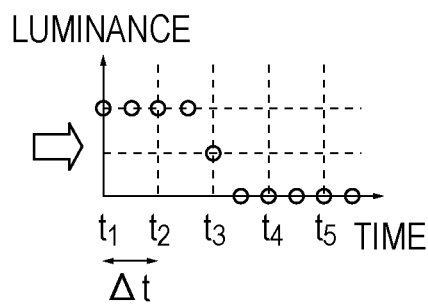
FIG. 7C is a diagram illustrating the example of the correction process according to the first embodiment.

As illustrated in FIG. 7C, the correction unit 16 corrects only one of the two drive signals corresponding to the input video signal at time $t_3$, i.e., the drive signal (time $t_3$+delta t/2). However, the luminance of the drive signal at time $t_3$ may be reduced. Therefore, the correction unit 16 may correct at least one of a plurality of drive signals corresponding to an input video signal. Specifically, when the luminance of a second frame (second input frame data) is lower than the luminance of a first frame (first input frame data) by a threshold value or more, the correction unit 16 generates a display frame as follows.

The correction unit 16 reduces the luminance of a light emitting region in a display frame subsequent to the first display frame among a plurality of display frames corresponding to the first frame, as compared with that obtained when the luminance of a light emitting region in the second frame is not lower than the luminance of a light emitting region in the first frame by the threshold value or more. In this example, the correction unit 16 generates a display frame so that the luminance of a light emitting region in a display frame (the frame at time $t_3$+delta t/2) subsequent to the first display frame (the frame at time $t_3$) can be reduced.

Figure 7D:
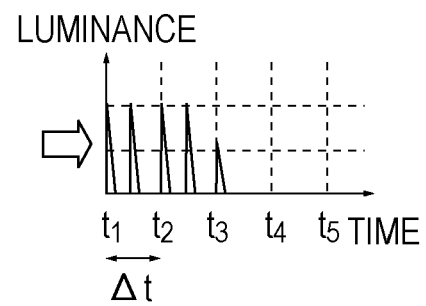
FIG. 7D is a diagram illustrating the example of the correction process according to the first embodiment.

The correction illustrated in FIG. 7C results in the actual luminance of the display screen as illustrated in FIG. 7D. As illustrated in FIG. 7D, the luminance of a light emitting pixel in the frame displayed at time $t_3$+delta t/2 is lower than that obtained when the drive signal is not corrected on the basis of the input video signal. This allows a user to perceive a more rapid change in luminance.

In the example illustrated in FIGS. 7A to 7D, the correction unit 16 corrects the drive signal so that the frame at time $t_3$+delta t/2 and the frame at time $t_4$ can have the same luminance value. However, the corrected luminance is not limited to this example. The correction unit 16 may correct the drive signal so that the corrected luminance of the frame at time $t_3$+delta t/2 can be lower than the luminance obtained before correction.

Figure 8A:
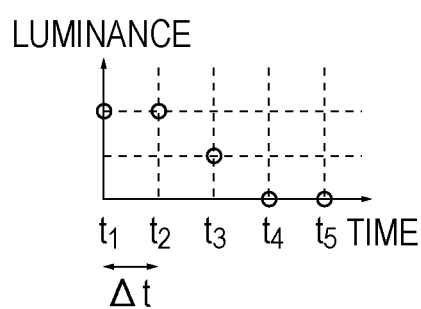
FIG. 8A is a diagram illustrating another example of the correction process according to the first embodiment.
Figure 8B:
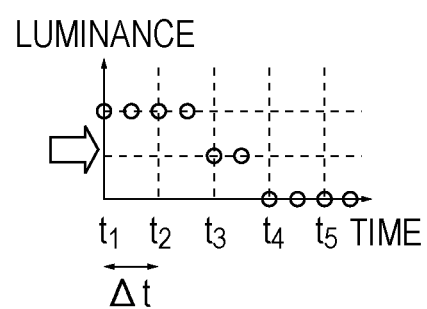
FIG. 8B is a diagram illustrating the other example of the correction process according to the first embodiment.

Next, an example of a case where the luminance of a pixel in a light emitting region is increased will be described with reference to FIGS. 8A to 8D. When the luminance of an object at a certain address actually changes in the manner illustrated in FIG. 6A, an input video signal illustrated in FIG. 8A is obtained. Then, the generation unit 15 generates a drive signal as illustrated in FIG. 8B on the basis of the input video signal. It is assumed that the obtaining unit 13 determines that a rapid decrease in luminance has occurred during a period from time $t_3$ to time $t_4$. When the determination unit 14 determines that the pixel is in a light emitting region, the correction unit 16 is notified of the address of the pixel. When the luminance of the pixel at the notified address in a frame at time $t_3$ is higher than a predetermined luminance value, the determination unit 14 determines that the pixel is a light emitting pixel.

The correction unit 16 corrects the drive signal so that the luminance of the pixel at the address output from the determination unit 14 can be higher than the luminance of the drive signal. The corrected panel drive signal is as illustrated in, for example, FIG. 8C. In this manner, the correction unit 16 corrects the drive signal generated by the generation unit 15 so that the decrease in luminance from the first frame to the second frame is rapid and so that the luminance of a pixel (light emitting pixel) for which the luminance obtained before the decrease is higher than a predetermined luminance value can be increased.

Specifically, the correction unit 16 generates a display frame (panel drive signal) corresponding to the first frame (first input frame data). When the luminance of a light emitting region (first region) in a display frame corresponding to a second frame input after the first frame is lower than the luminance of a light emitting region in the display frame corresponding to the first frame by a threshold value or more, the correction unit 16 generates a display frame as follows. That is, the correction unit 16 generates a display frame so that the luminance of a light emitting region in the display frame corresponding to the first frame is higher than that obtained when the luminance of a light emitting region in the second frame is not lower than the luminance of a light emitting region in the first frame by the threshold value or more.

Figure 8C:
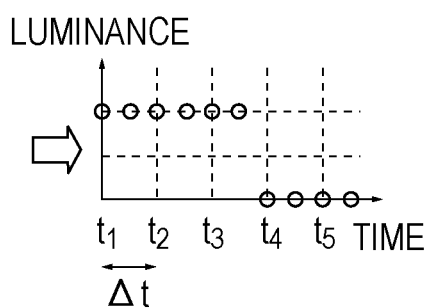
FIG. 8C is a diagram illustrating the other example of the correction process according to the first embodiment.

As illustrated in FIG. 8C, the correction unit 16 corrects both the two drive signals (drive signals at time $t_3$ and at time $t_3$+delta t/2) corresponding to the input video signal at time $t_3$. However, for example, only the drive signal at time $t_3$ may be corrected so as to be increased. Therefore, the correction unit 16 may correct at least one of a plurality of drive signals corresponding to an input video signal.

Specifically, when the luminance of a second frame (second input frame data) is lower than the luminance of a first frame (first input frame data) by a threshold value or more, the correction unit 16 generates a display frame as follows. That is, the correction unit 16 generates a display frame so that the luminance of a display frame preceding the first display frame among a plurality of display frames corresponding to the first frame can be higher than that obtained when the luminance of the second frame is not lower than the luminance of the first frame by the threshold value or more.

For example, the correction unit 16 can generate a display frame so that the luminance of the display frame (the frame at time $t_3$) preceding the first display frame (the frame at time $t_3$+delta t/2) can be high. In this case, the correction unit 16 does not correct the luminance of the frame at time $t_3$.

Figure 8D:
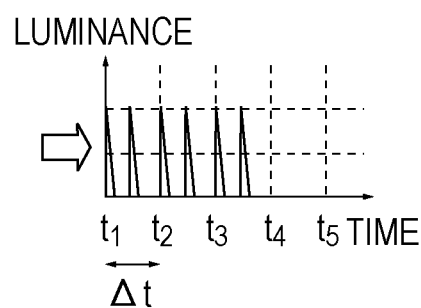
FIG. 8D is a diagram illustrating the other example of the correction process according to the first embodiment.

The correction illustrated in FIG. 8C results in the actual luminance of the display screen as illustrated in FIG. 8D. As illustrated in FIG. 8D, the luminance of a light emitting pixel in the frame displayed at time $t_3$ and the frame displayed at time $t_3$+delta t/2 is higher than that obtained when the drive signal is not corrected on the basis of the input video signal. This allows a user to perceive a more rapid change in luminance.

In the example of FIGS. 8A to 8D, the correction unit 16 corrects the drive signal so that the frame at time $t_3$ and the frame at time $t_3$+delta t/2 have the same luminance value as the frame at time $t_2$. However, the corrected luminance is not limited to this example. The correction unit 16 may correct the drive signal so that the corrected luminance of the frame at time $t_3$ and the corrected luminance of the frame at time $t_3$+delta t/2 can be higher than the luminance obtained before correction.

Figure 5:
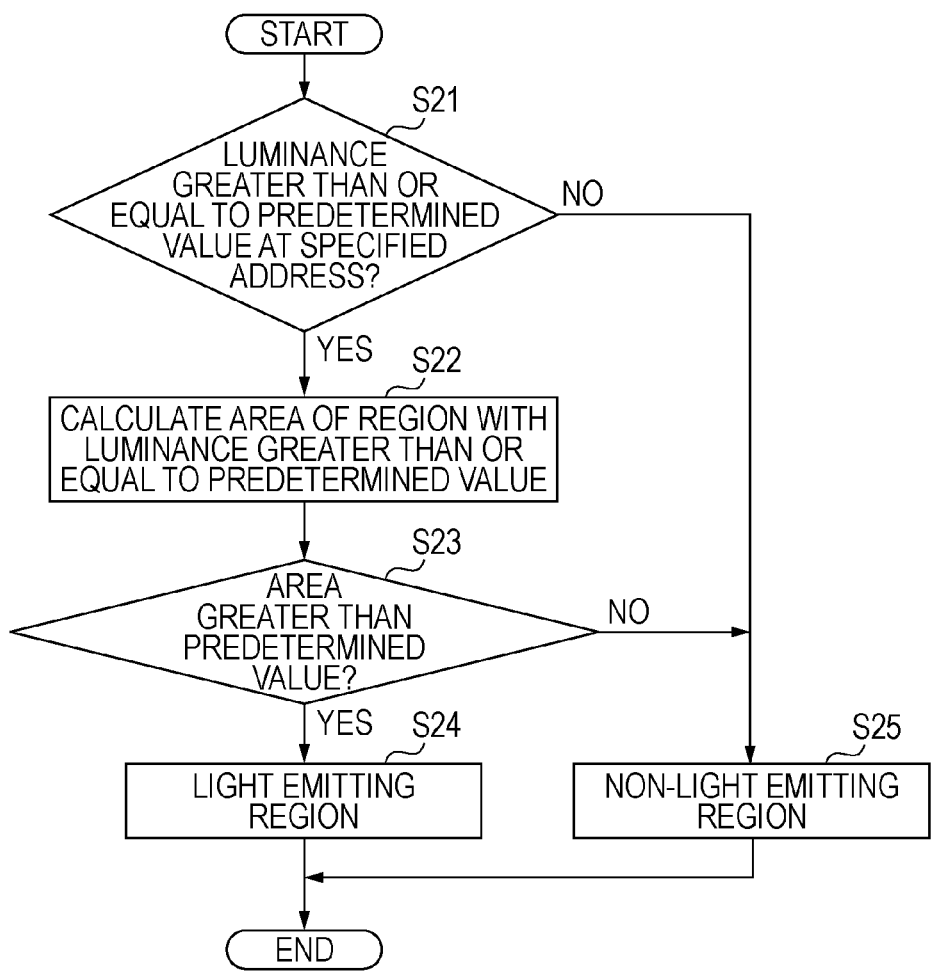
FIG. 5 is a flowchart illustrating a process for determining a light emitting pixel.

Next, the detailed operation of the determination unit 14 will be described with reference to FIG. 5.

In step S21, the determination unit 14 determines, for a pixel that is determined by the obtaining unit 13 to have a rapid decrease in luminance, whether or not the luminance obtained before the rapid decrease is higher than a predetermined luminance value, to thereby determine whether or not the pixel is a light emitting pixel. It may be determined whether or not the change in brightness is rapid by using color-related components other than luminance. For example, while the luminance component is changed in response to a rapid change in light, the amount of change in color component is small. This characteristic can be used. That is, ab values in L*a*b* space can be calculated, and it may be determined whether or not the amount of change in the ab component is equal to or less than a predetermined value, to thereby determine whether or not the change in brightness is rapid. After the determination unit 14 determines a light emitting pixel in step S21, the process proceeds to step S22.

In step S22, the determination unit 14 obtains the area of a region formed by light emitting pixels. In other words, the determination unit 14 obtains the area of a region having consecutive light emitting pixels. When there are a plurality of regions formed by light emitting pixels, the determination unit 14 obtains the area of each of the regions. When the determination unit 14 obtains the area of the region formed by light emitting pixels, the process proceeds to step S23.

In step S23, the determination unit 14 determines whether or not the area of the region formed by light emitting pixels is larger than a predetermined value. When there are a plurality of regions formed by light emitting pixels, it is determined whether or not the area of each of the regions is larger than the predetermined value. When the determination unit 14 has completed the determination for all the regions, the process proceeds to step S24.

In step S24, the determination unit 14 determines that a region for which it is determined that the area of a region formed by light emitting pixels is larger than the predetermined value is a light emitting region, and notifies the correction unit 16 of the address of the region. The determination unit 14 further determines that a region whose area is smaller than the predetermined value (for example, the area of a region having ten pixels) within the region that is determined in step S21 to be a region formed of light emitting pixels is a non-light emitting region (step S25), and does not notify the correction unit 16 of the address of the non-light emitting region.

Then, the determination unit 14 notifies the correction unit 16 of the address of the region determined to be a light emitting region. This can prevent the application of the present invention to a rapid change in luminance over time caused by, for example, a noise signal. However, the drive signal can also be corrected, without taking the area into consideration, so that the change in luminance for all light emitting pixels can become rapid.

Accordingly, the obtaining unit 13 according to the embodiment determines whether or not a pixel having a rapid decrease in luminance exists in a display frame corresponding to an input video signal. The correction unit 16 corrects the luminance of a display frame corresponding to a pixel (light emitting pixel) for which the luminance obtained before the rapid decrease is higher than a predetermined luminance value among pixels having a rapid decrease in luminance. This correction may be correction in such a manner that the change in luminance of a display screen can be more rapid than that obtained without correction. That is, the correction unit 16 generates a display frame by correcting the drive signal so that the change in luminance of the display screen can become more rapid than that obtained when video is displayed in accordance with an input video signal.

This allows display of video that more reflects a rapid change in luminance of an object to be photographed.

Second Embodiment

A second embodiment of the present invention will now be described with reference to FIGS. 9 and 10A to 10D. The first embodiment has been described in the context of, by way of example, the correction of a drive signal generated with respect to an input video signal in order to facilitate a change in luminance of a pixel determined to be a light emitting pixel. The second embodiment, in contrast, will be described in the context of the correction of an input video signal in order to facilitate a change in luminance of a pixel determined to be a light emitting pixel.

Figure 9:
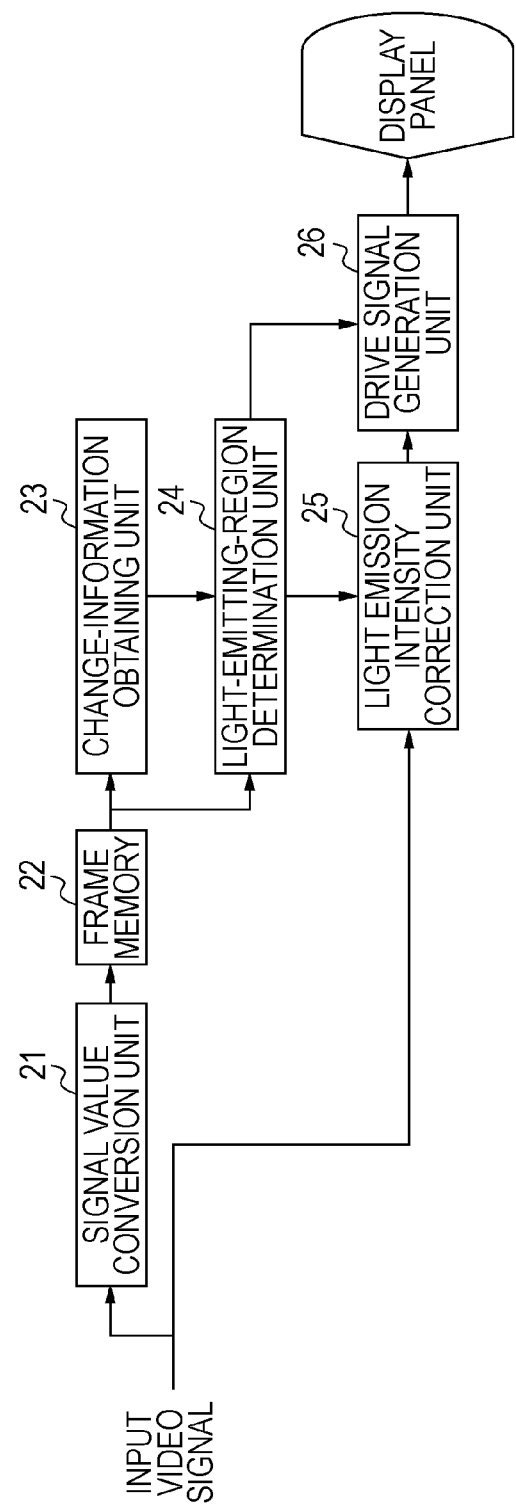
FIG. 9 is a block diagram illustrating a display control apparatus according to a second embodiment.

FIG. 9 is a block diagram illustrating an example configuration of a display control apparatus according to the second embodiment. The display control apparatus according to the embodiment may be configured to control a display frame to be displayed with respect to an input video signal (input frame data).

As illustrated in FIG. 9, the display control apparatus according to the embodiment includes a signal value conversion unit 21 (hereinafter referred to as a "conversion unit 21"), a frame memory 22, a change-information obtaining unit 23 (hereinafter referred to as an "obtaining unit 23"), and a light-emitting-region determination unit 24 (hereinafter referred to as a "determination unit 24"). The display control apparatus according to the embodiment further includes a light emission intensity correction unit 25 (hereinafter referred to as a "correction unit 25") and a drive signal generation unit 26 (hereinafter referred to as a "generation unit 26"). As in the first embodiment, the display control apparatus according to the embodiment also has a built-in computer. The conversion unit 21, the frame memory 22, the obtaining unit 23, and the determination unit 24 correspond to the conversion unit 11, the frame memory 12, the obtaining unit 13, and the determination unit 14 according to the first embodiment, respectively.

The correction unit 25 corrects an input video signal so that the luminance can be changed in a light emitting region.

A specific example of a process according to the embodiment will now be described with reference to FIGS. 10A to 10D.

Figure 10A:
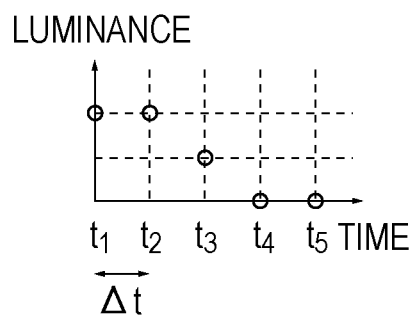
FIG. 10A is a diagram illustrating a process according to the second embodiment.

First, when the luminance of an object at a certain address changes in the manner illustrated in FIG. 6A, an input video signal corresponding to the address is as illustrated in FIG. 10A. Further, the obtaining unit 23 determines whether or not a rapid decrease in luminance has occurred at each address on the basis of an input video signal, and the determination unit 24 determines whether or not a pixel at an address at which a rapid decrease in luminance has occurred is a light emitting pixel. The determination unit 14 also determines whether or not the area of a region formed by light emitting pixels is equal to or greater than a predetermined value to determine whether or not the region is a light emitting region. In the illustrated example, it is determined that a pixel at time $t_3$ illustrated in FIG. 10A is a pixel in a light emitting region. Then, the correction unit 25 corrects an input video signal corresponding to the light emitting region. This correction may be correction in such a manner that the change in luminance of a display screen can be more rapid than that obtained without correction.

Figure 10B:
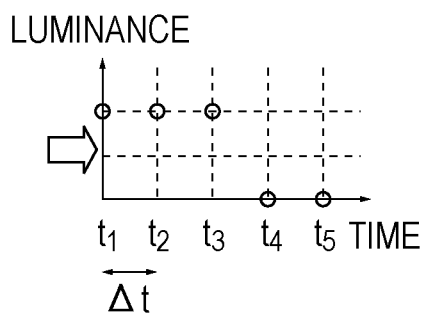
FIG. 10B is a diagram illustrating the process according to the second embodiment.
Figure 10C:
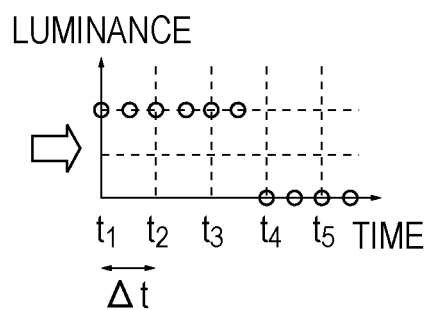
FIG. 10C is a diagram illustrating the process according to the second embodiment.

The input video signal corrected by the correction unit 25 is as illustrated in FIG. 10B. With the correction, the luminance of a region determined to be a light emitting pixel in the frame at time $t_3$ can be higher than the luminance corresponding to the input video signal. The correction may also be performed so that the luminance of a region determined to be a light emitting pixel can be reduced. The correction unit 25 outputs the corrected input video signal to the generation unit 26.

Figure 10D:
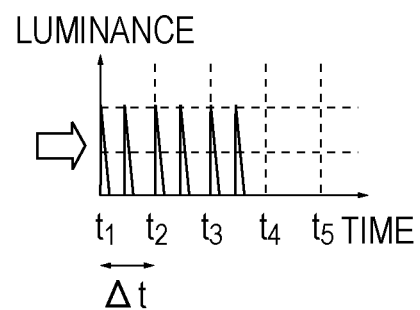
FIG. 10D is a diagram illustrating the process according to the second embodiment.

The generation unit 26 generates a drive signal on the basis of the corrected input video signal. Video based on the drive signal generated by the generation unit 26 is displayed on a display panel. Specifically, the generation unit 26 generates a display frame corresponding to a first frame (first input frame data). The generated drive signal is as illustrated in, for example, FIG. 10C. The luminance of a display screen displayed on the basis of the drive signal is as illustrated in FIG. 10D. As illustrated in FIG. 10D, the luminance of the frame at time $t_3$ and the luminance of the frame at time $t_3$+delta t/2 is higher than the luminance obtained before correction. As a result, the change in luminance between the frame displayed at time $t_3$+delta t/2 and the subsequent frame displayed at time $t_4$ becomes rapid.

Next, a process according to the embodiment will be described with reference to a flowchart illustrated in FIG. 3.

In the second embodiment, processing similar to the processing of steps S11 to S15 according to the first embodiment is performed, which will not be discussed herein. In step S16, the correction unit 25 corrects the input video signal on the basis of the address of the light emitting region notified by the determination unit 24. Then, in step S16, the generation unit 26 generates a panel drive signal (display frame) on the basis of the input video signal corrected by the correction unit 25. That is, in step S16, the generation unit 26 generates a display frame.

Specifically, the generation unit 26 generates a display frame (panel drive signal) corresponding to the first frame (first input frame data). When the luminance of a light emitting region (first region) in a display frame corresponding to a second frame input after the first frame is lower than the luminance of the first region in the display frame corresponding to the first frame by the threshold value or more, the generation unit 26 generates a display frame as follows. That is, the generation unit 26 generates a display frame so that the luminance of the first region in the display frame corresponding to the first frame can be higher than that obtained when the luminance of the first region in the second frame is not lower than the luminance of the first region in the first frame by a threshold value or more. However, the generation unit 26 may generate a display frame so that the luminance of the first region in the display frame corresponding to the first frame can be reduced.

In the display control apparatus according to the embodiment, therefore, video that more reflects a rapid change in luminance of an object to be photographed can be displayed.

Third Embodiment

A third embodiment of the present invention will now be described with reference to FIGS. 11 and 12A to 12E. The embodiment will be described in the context of correction of the luminance of a region determined to be a light emitting pixel based on the amount of adjustment input from a user.

Figure 11:
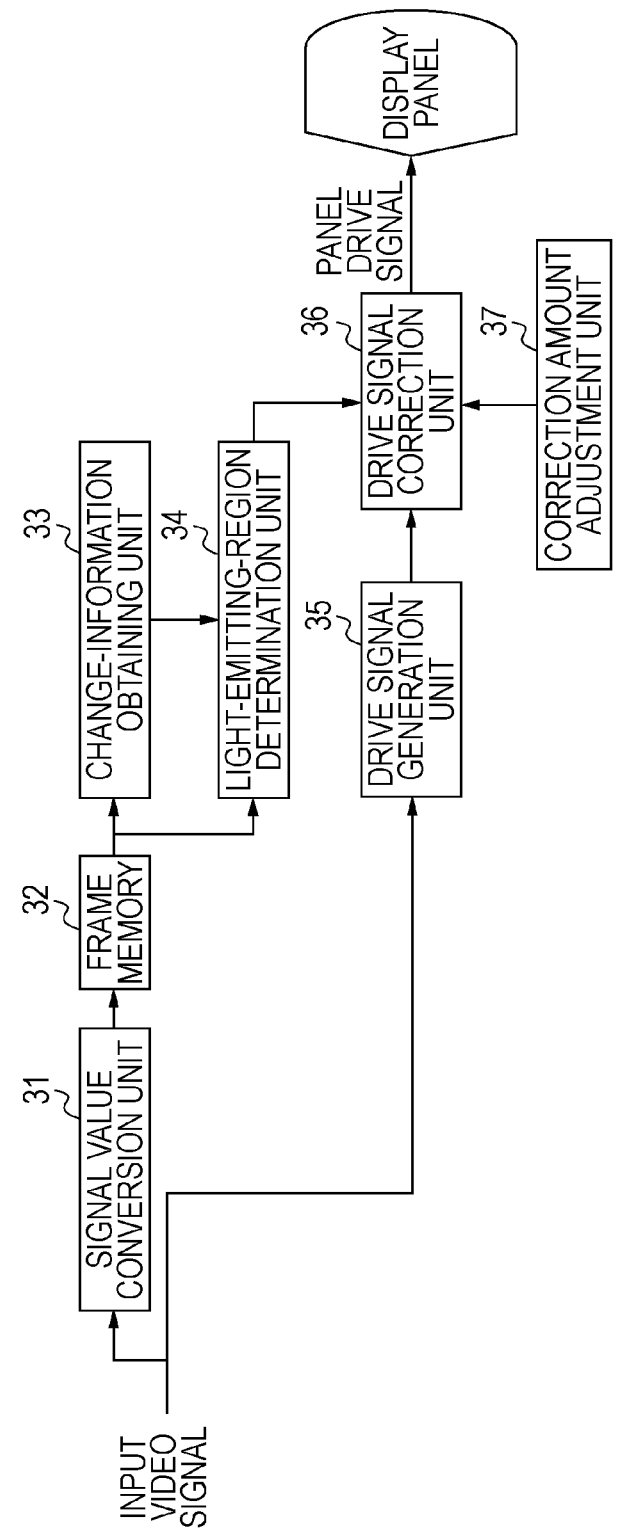
FIG. 11 is a block diagram illustrating a display control apparatus according to a third embodiment.

FIG. 11 is a block diagram illustrating an example configuration of a display control apparatus according to the embodiment. The display control apparatus according to the present embodiment may be configured to control a display frame to be displayed with respect to an input video signal (input frame data).

As illustrated in FIG. 11, the display control apparatus according to the embodiment includes a signal value conversion unit 31 (hereinafter referred to as a "conversion unit 31"), a frame memory 32, a change-information obtaining unit 33 (hereinafter referred to as an "obtaining unit 33"), and a light-emitting-region determination unit 34 (hereinafter referred to as a "determination unit 34"). The display control apparatus according to the embodiment further includes a drive signal generation unit 35 (hereinafter referred to as a "generation unit 35"), a drive signal correction unit 36 (hereinafter referred to as a "correction unit 36"), and a correction amount adjustment unit 37 (hereinafter referred to as an "adjustment unit 37"). As in the first embodiment, the display control apparatus according to the embodiment also has a built-in computer. The conversion unit 31, the frame memory 32, the obtaining unit 33, the determination unit 34, and the generation unit 35 correspond to the conversion unit 11, the frame memory 12, the obtaining unit 13, the determination unit 14, and the generation unit 15 according to the first embodiment, respectively.

The correction unit 36 according to the embodiment corrects a drive signal generated by the generation unit 35 on the basis of an address output from the determination unit 34 and an amount of correction output from the adjustment unit 37. The adjustment unit 37 adjusts the amount of correction by which the correction unit 36 corrects the drive signal in accordance with an input from a user.

A specific example of a process according to the embodiment will now be described with reference to FIGS. 12A to 12E.

Figure 12A:
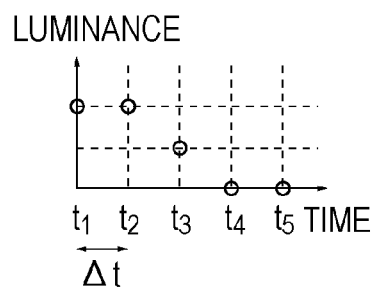
FIG. 12A is a diagram illustrating a process according to the third embodiment.
Figure 12B:
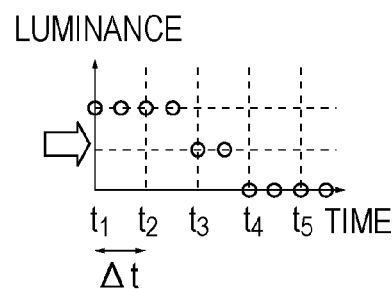
FIG. 12B is a diagram illustrating the process according to the third embodiment.

First, when the luminance of an object at a certain address changes in the manner illustrated in FIG. 6A, an input video signal corresponding to the address is as illustrated in FIG. 12A. Further, the obtaining unit 33 determines whether or not a rapid decrease in luminance has occurred at each address on the basis of an input video signal, and the determination unit 34 determines whether or not a pixel at an address at which a rapid decrease in luminance has occurred is a light emitting pixel. Then, the determination unit 34 determines whether or not the area of a region formed by light emitting pixels is equal to or greater than a predetermined value to determine whether or not the region is a light emitting region.

On the other hand, the generation unit 35 generates a drive signal corresponding to the input video signal. The drive signal generated by the generation unit 35 is as illustrated in, for example, FIG. 12B. Then, the correction unit 36 corrects a drive signal corresponding to a region determined to be a light emitting region. This correction may be correction in such a manner that the change in luminance of a display screen can be more rapid than that obtained without correction. Examples of the drive signal corrected by the correction unit 36 are as illustrated in, for example, FIGS. 12C, 12D, and 12E.

Figure 12C:
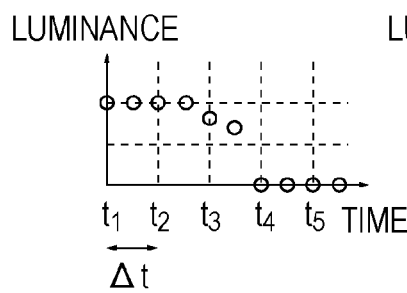
FIG. 12C is a diagram illustrating the process according to the third embodiment.
Figure 12D:
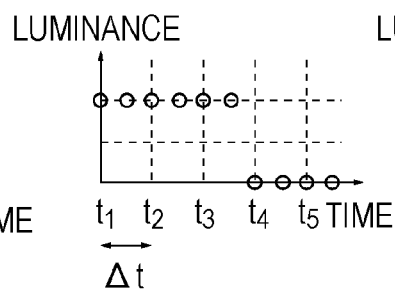
FIG. 12D is a diagram illustrating the process according to the third embodiment.
Figure 12E:
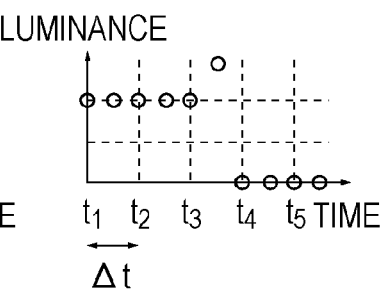
FIG. 12E is a diagram illustrating the process according to the third embodiment.

As illustrated in FIGS. 12C, 12D, and 12E, with the correction performed by the correction unit 36, the luminance of a region determined to be a light emitting pixel within a frame displayed at time $t_3$ can be higher than that obtained without correction. The correction unit 36 may also perform correction so that the luminance of a region determined to be a light emitting pixel can be reduced. The correction unit 36 outputs the corrected drive signal to a display panel. FIG. 12C illustrates a corrected drive signal obtained when the amount of correction of the drive signal is set to be small.

FIG. 12D illustrates a corrected drive signal obtained when the amount of correction of the drive signal is set to be greater than that illustrated in FIG. 12C. FIG. 12E illustrates a corrected drive signal obtained when the amount of correction of the drive signal is set to be greater than that illustrated in FIG. 12D. As in FIG. 12D, the change in luminance of a display screen can be made more rapid than the actual change in luminance of an object, thereby allowing the rapid change in luminance to be more pronounced.

Next, a process according to the embodiment will now be described with reference to a flowchart of FIG. 3.

In the third embodiment, processing similar to the processing of steps S11 to S15 according to the first embodiment is performed, which will not be discussed herein. In step S16, the correction unit 36 corrects a drive signal output from the generation unit 35 on the basis of the address of the light emitting region notified by the determination unit 34 and the amount of correction notified by the adjustment unit 37.

Specifically, the correction unit 36 generates a display frame (panel drive signal) corresponding to the first frame (first input frame data). When the luminance of a light emitting region (first region) in a display frame corresponding to a second frame input after the first frame is lower than the luminance of the first region in the display frame corresponding to the first frame by the threshold value or more, the correction unit 26 generates a display frame as follows. That is, the correction unit 36 generates a display frame so that the luminance of the first region in the display frame corresponding to the first frame can be higher than that obtained when the luminance of the first region in the second frame is not lower than the luminance of the first region in the first frame by a threshold value or more. However, the correction unit 36 may generate a display frame so that the luminance of the first region in the display frame corresponding to the first frame can be reduced.

In the display control apparatus according to the embodiment, therefore, video that more reflects a rapid change in luminance of an object to be photographed can be displayed.

In the display control apparatus according to the embodiment, furthermore, how a rapid change in luminance of an object to be photographed is reflected in display of video can be determined in accordance with a user selection.

Other Embodiments

An embodiment of the present invention can also be achieved by providing a system or an apparatus with a storage medium storing program code of software for implementing the functions of the embodiments described above. Then, a computer (or a CPU or a microprocessing unit (MPU)) provided in the system or apparatus reads and executes the program code stored in the storage medium. In this case, the program code recorded from the storage medium may implement the functions of the embodiments described above, and the storage medium storing the program code may constitute an embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-058269, filed Mar. 11, 2009, which is hereby incorporated by reference herein in its entirety.

REFERENCE SIGNS LIST 13, 23, 33 Change-information obtaining unit
14, 24, 34 Light-emitting-region determination unit
16, 36 Drive signal correction unit
25 Light emission intensity correction unit
37 Correction amount adjustment unit

The invention claimed is:

1. A display control apparatus for controlling a display frame corresponding to input frame data, comprising:
   an input unit configured to receive input frame data;
   a calculation unit configured to calculate a first rate of change in luminance from a luminance of input first input frame data and a luminance of second input frame data that is input immediately after the first input frame data, and a second rate of change in luminance from the luminance of the first input frame data and a luminance of third input frame data that is input before the first input frame data;
   a correction unit configured to, in a case where the first rate of change in luminance is larger than the second rate of change in luminance and the luminance of the second input frame data is smaller than the luminance of the first input frame data and the luminance of the third input frame data, correct the luminance of the first input frame data so as to be higher than the luminance before the correction; and
   a generation unit configured to generate a first display frame and a second display frame from the input frame data so that a drive frequency for displaying the corrected first input frame data is twice as high as a drive frequency for displaying the first input frame data.

2. A display control method performed by a display control apparatus for controlling a display frame corresponding to input frame data, comprising:
   an input step of receiving input frame data;
   a calculation step of calculating a first rate of change in luminance from a luminance of input first input frame data and a luminance of second input frame data that is input immediately after the first input frame data, and a second rate of change in luminance from the luminance of the first input frame data and a luminance of third input frame data that is input before the first input frame data;
   a correction step of, in a case where the first rate of change in luminance is larger than the second rate of change in luminance and the luminance of the second input frame data is smaller than the luminance of the first input frame data and the luminance of the third input frame data, correcting the luminance of the first input frame data so as to be higher than the luminance before the correction; and
   a generating step of generating a first display frame and a second display frame from the input frame data so that a drive frequency for displaying the corrected first input frame data is twice as high as a drive frequency for displaying the first input frame data.

3. A non-transitory computer-readable storage medium storing a program for causing a computer for controlling a display frame corresponding to input frame data to execute:
   an input step of receiving input frame data;
   a calculation step of calculating a first rate of change in luminance from a luminance of input first input frame data and a luminance of second input frame data that is input immediately after the first input frame data, and a second rate of change in luminance from the luminance of the first input frame data and a luminance of third input frame data that is input before the first input frame data;
   a correction step of correcting, in a case where the first rate of change in luminance is larger than the second rate of change in luminance and the luminance of the second input frame data is smaller than the luminance of the first input frame data and the luminance of the third input frame data, the luminance of the first input frame data so as to be higher than the luminance before the correction; and
   a generating step of generating a first display frame and a second display frame from the input frame data so that a drive frequency for displaying the corrected first input frame data is twice as high as a drive frequency for displaying the first input frame data.

* * * * *